United States Patent
Dolin et al.

(10) Patent No.: US 8,896,276 B1
(45) Date of Patent: Nov. 25, 2014

(54) BOOST-BUCK DC-DC CONVERTER

(71) Applicant: Anadigics, Inc., Warren, NJ (US)

(72) Inventors: Adam Dolin, Springfield, NJ (US); Paul Sheehy, Easton, PA (US); Dirk Leipold, Califon, NJ (US)

(73) Assignee: Anadigics, Inc., Warren, NJ (US)

( * ) Notice: Subject to any disclaimer, the term of this patent is extended or adjusted under 35 U.S.C. 154(b) by 319 days.

(21) Appl. No.: 13/624,339

(22) Filed: Sep. 21, 2012

Related U.S. Application Data

(60) Provisional application No. 61/538,583, filed on Sep. 23, 2011.

(51) Int. Cl.
*H02M 3/156* (2006.01)
*H02M 1/14* (2006.01)

(52) U.S. Cl.
USPC ............ 323/225; 323/282; 323/344; 323/351

(58) Field of Classification Search
USPC ................. 323/225, 259, 282–290, 344, 351
See application file for complete search history.

(56) References Cited

U.S. PATENT DOCUMENTS

| | | | | |
|---|---|---|---|---|
| 5,654,626 A | * | 8/1997 | Karlsson | 323/222 |
| 7,538,535 B2 | * | 5/2009 | McDonald et al. | 323/288 |
| 8,143,874 B2 | * | 3/2012 | Templeton | 323/283 |
| 8,487,599 B2 | * | 7/2013 | Lee et al. | 323/282 |
| 8,604,768 B2 | * | 12/2013 | Dowlatabadi | 323/284 |

* cited by examiner

*Primary Examiner* — Jessica Han
(74) *Attorney, Agent, or Firm* — William L. Botjer

(57) ABSTRACT

A DC-DC converter, capable of operation in either a boost or buck mode, includes a voltage source connected to an input switch through an inductive element such that a closed loop is formed. The DC-DC converter includes a switching network that receives one or more clock signals from an external clock source. The switching network has a first terminal connected to the inductive element, a second terminal connected to a first capacitor, and a third terminal connected to a second capacitor, wherein the switching network enables charging of the first capacitor and the second capacitor based on one or more clock signals such that the first capacitor and the second capacitor are charged alternately. The DC-DC converter includes a filter connected to a fourth terminal of the switching network, wherein the first capacitor and the second capacitor discharge alternately based on the one or more clock signals through the filter.

19 Claims, 3 Drawing Sheets

BOOST-BUCK DC-DC CONVERTER

CROSS REFERENCE TO RELATED APPLICATION

This application claims priority from the U.S. provisional application No. 61/538,583, titled "Back to Back Boost-Buck DCDC Converter", filed on Sep. 23, 2011, the disclosure of which is hereby incorporated by reference.

TECHNICAL FIELD

The presently disclosed embodiments are related, in general, to a DC-DC converter. More particularly, the presently disclosed embodiments are related to the DC-DC converter that operates in either a boost or a buck mode.

BACKGROUND OF THE INVENTION

DC-DC converters are used widely in a number of electronic devices. A typical boost DC-DC converter increases the output voltage ($V_o$) range above the input voltage ($V_i$) range. For example, if input voltage to a boost DC-DC converter is 5V, output voltage of the boost DC-DC converter is greater than 5V. A typical buck converter decreases the output voltage range below the input voltage range. For example, if input voltage to a buck DC-DC converter is 5V, output voltage of the buck DC-DC converter is less than 5V.

A typical DC-DC converter includes an output load, an inductive element, a switch, and a bypass capacitor. Charging and discharging of the inductive element determines the operation of the DC-DC converter. Further, the switch controls the charging and discharging of the inductive element. The inductive element resists the change in state of the switch by generating a voltage spike. The voltage spike, which can cause noise and distortion at the output terminal of the DC-DC converter, is filtered by the bypass capacitor. For proper operation of the electronic circuit, such voltage spikes are undesirable.

SUMMARY OF THE INVENTION

According to embodiments illustrated herein, there is provided a DC-DC converter operating in at least one of a first mode and a second mode. The DC-DC converter includes a voltage source connected to an input switch formed by a first transistor through an inductive element such that a closed loop is formed. The DC-DC converter further includes a switching network. The switching network includes a second transistor having a source terminal connected to the inductive element and the input switch, a drain terminal connected to a first capacitor, and a gate terminal receiving a second clock signal when the DC-DC converter operates in the first mode, wherein the second transistor operates in the ON state when the DC-DC converter operates in the second mode.

The switching network further includes a third transistor having a source terminal connected to the drain terminal of the second transistor, a gate terminal receiving an inverted second clock signal when the DC-DC converter operates in the first mode, and the gate terminal receiving a first clock signal when the DC-DC converter operates in the second mode. The switching networks further includes a fourth transistor having a source terminal connected to a ground terminal; a drain terminal connected to a drain terminal of the third transistor, a gate terminal receiving an first clock signal when the DC-DC converter operates in the second mode, wherein the fourth transistor operates in the OFF state when the DC-DC converter operates in the first mode.

The switching networks further includes a fifth transistor having a source terminal connected to the source terminal of the second transistor, a drain terminal connected to a second capacitor, a gate terminal receiving a third clock signal when the DC-DC converter operates in the first mode, wherein the fifth transistor operates in the ON state when the DC-DC converter operates in the second mode. The switching networks further includes a sixth transistor having a source terminal connected to the drain terminal of the fifth transistor, a drain terminal connected to the drain terminal of the fourth transistor, and a gate terminal receiving an inverted third clock signal when the DC-DC converter operates in the first mode, wherein the gate terminal receiving the first clock signal when the DC-DC converter operates in the second mode. The switching networks further includes a seventh transistor having a drain terminal connected to the drain terminal of the sixth transistor, a source terminal connected to the ground terminal, and a gate terminal receiving the first clock signal when the DC-DC converter operates in the second mode, wherein the seventh transistor operates in the OFF state when the DC-DC converter operates in the first mode. The first capacitor and the second capacitor are charged alternately based on the second clock signal and the third clock signal when the DC-DC converter operates in the first mode. The switching networks further includes a filter connected to the drain terminal of the sixth transistor, wherein the first capacitor and the second capacitor discharge through the filter alternately based on the inverted second clock signal and the inverted third clock signal.

BRIEF DESCRIPTION OF DRAWINGS

The following detailed description of the embodiments of the present invention will be better understood when read in conjunction with the appended drawings. The present invention is illustrated by way of example, and not limited by the accompanying figures, in which like references indicate similar elements.

DETAILED DESCRIPTION OF THE PREFERRED EMBODIMENTS

The invention can be best understood with reference to the detailed figures and description set forth herein. Various embodiments are discussed below with reference to the figures. However, those skilled in the art will readily appreciate that the detailed description given herein with respect to these figures is simply for explanatory purposes. The disclosed systems or circuits extend beyond the described embodiments. For example, those skilled in the art will appreciate that in light of the teachings presented, multiple alternate and suitable approaches may be realized, to implement the functionality of any detail described herein, beyond the particular implementation choices in the following embodiments described and shown.

Figure 1:
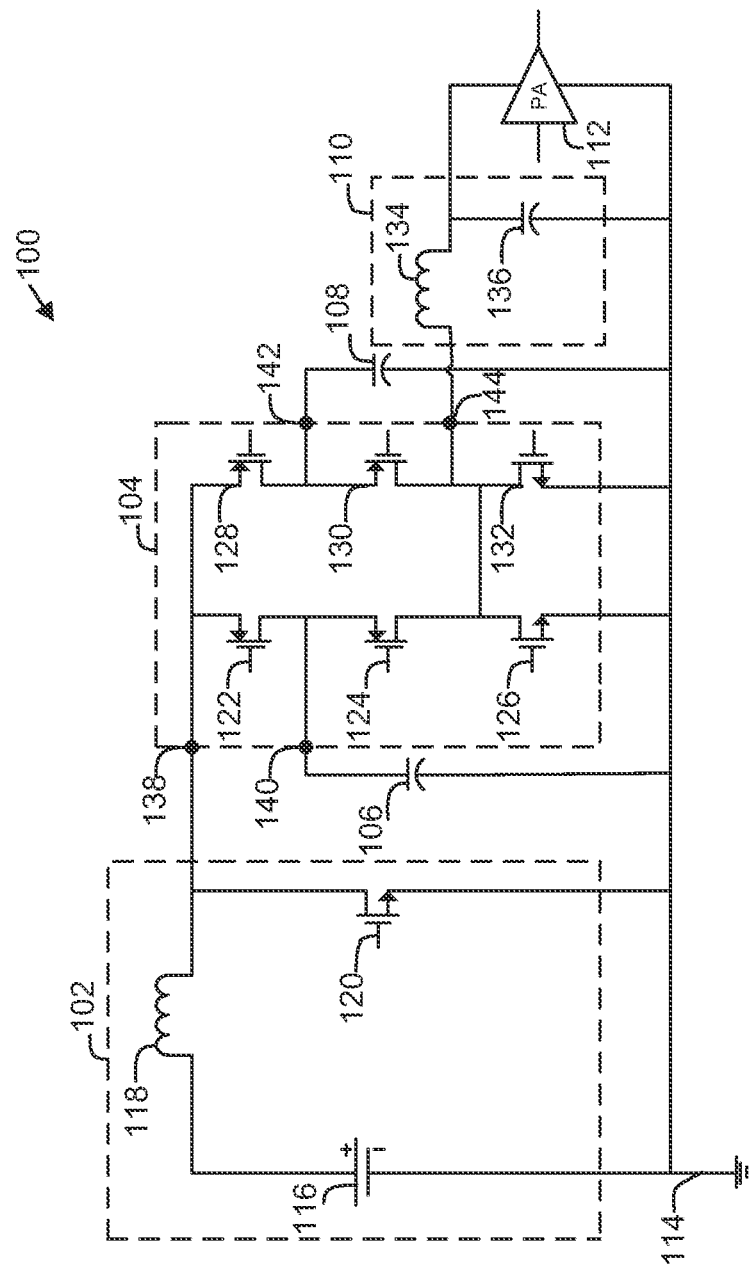
FIG. 1 is a schematic diagram depicting a boost-buck DC-DC converter in accordance with an embodiment of the invention.

FIG. 1 is a schematic diagram depicting a boost-buck DC-DC converter 100 in accordance with an embodiment of the invention. The DC-DC converter 100 includes an input circuit 102, a switching network 104, a first capacitor 106, a second capacitor 108, a filter 110, a power amplifier 112, and a ground terminal 114. The input circuit 102 includes a voltage source 116, a first inductive element 118, and an input switch 120 formed by a first transistor. In an embodiment, the voltage source 116 is a battery. The switching network 104 includes a second transistor 122, a third transistor 124, a fourth transistor 126, a fifth transistor 128, a sixth transistor 130, and a seventh transistor 132. The filter 110 includes a second inductive element 134 and a third capacitor 136.

For the purpose of the ongoing description, the input switch 120 has been realized by an N-MOS (N-channel Metal Oxide Semiconductor) transistor. Further, the second transistor 122, the third transistor 124, the fifth transistor 128, and the sixth transistor 130 have been realized by a P-MOS transistor. Furthermore, the fourth transistor 126 and the seventh transistor 132 correspond to an N-MOS transistor. However, it will be apparent to a person having ordinary skill that any other type of active device such as a P-MOS, a BJT, a FET, a Pseudomorphic High Electron Mobility Transistor (PHEMT), Metal Semiconductor Field Effect Transistor (MESFET), and the like, may also be used in place of the input switch 120 and the transistors in the switching network 104 without departing from the scope of the present invention.

A positive terminal of the voltage source 116 is connected to the first inductive element 118. The first inductive element 118 is connected to a drain terminal of the first transistor 120 and a first terminal 138 of the switching network 104. A source terminal of the first transistor 120 is connected to the ground terminal 114. Further, the source terminal of the first transistor 120 is connected to a negative terminal of the voltage source 116. In the switching network 104, a source terminal of the second transistor 122 is connected to the first terminal 138. A drain terminal of the second transistor 122 is connected to the first capacitor 106 through a second terminal 140 of the switching network 104. The third transistor 124 has a source terminal connected to the drain terminal of the second transistor 122. The drain terminal of the third transistor 124 is connected to the filter 110 through a fourth terminal 144 of the switching network 104. The fourth transistor 126 has a drain terminal connected to the drain terminal of the third transistor 124. A source terminal of the fourth transistor 126 is connected to the ground terminal 114. The fifth transistor 128 has a source terminal connected to the first terminal 138. A drain terminal of the fifth transistor 128 is connected to the second capacitor 108 through a third terminal 142 of the switching network 104. The sixth transistor 130 has a source terminal connected to the drain terminal of the fifth transistor 128. A drain terminal of the sixth transistor 130 is connected to the filter 110 through the fourth terminal 144. The seventh transistor 132 has a drain terminal connected to the drain terminal of the sixth transistor 130. A source terminal of the seventh transistor 132 is connected to the ground terminal 114. In the filter 110, the second inductive element 134 is connected to the fourth terminal 144 of the switching network 104. Further, the second inductive element 134 is connected to the third capacitor 136. The power amplifier 112 is connected across the third capacitor 136.

In an embodiment, the DC-DC converter 100 operates in a buck mode or a boost mode depending on the state of the first transistor 120, the second transistor 122, the third transistor 124, the fourth transistor 126, the fifth transistor 128, the sixth transistor 130, and the seventh transistor 132. Further, the state of the first transistor 120, the second transistor 122, the third transistor 124, the fourth transistor 126, the fifth transistor 128, the sixth transistor 130, and the seventh transistor 132 depends on the corresponding clock signals applied at the corresponding gate terminals.

In an embodiment, during the boost mode of operation, a gate terminal of the first transistor 120 receives a first clock signal, a gate terminal of the second transistor 122 receives a second clock signal, a gate terminal of the third transistor 124 receives an inverted second clock signal, a gate terminal of the fifth transistor 128 receives a third clock signal, and a gate terminal of the sixth transistor 130 receives an inverted third clock signal. Further, during the boost mode of operation, the fourth transistor 126 and the seventh transistor 132 operates in the OFF state. Since, the second transistor 122 receives the second clock signal and the third transistor 124 receives the inverted second clock signal, the second transistor 122 and the third transistor 124 operate in alternate states. For example, if the second transistor 122 operates in the ON state, the third transistor 124 would operate in the OFF state. Similarly, the fifth transistor 128 and the sixth transistor 130 operate in alternate states. The boost mode of operation is described later in conjunction with FIG. 2.

During the buck mode of operation, the second transistor 122 and the fifth transistor 128 operate in the ON state. The gate terminal of the third transistor 124 and a gate terminal of the seventh transistor 132 receive a first clock signal. The gate terminal of the fourth transistor 126 and the gate terminal of the sixth transistor 130 receive a first clock signal. Further, the first transistor 120 operates in the OFF state. The buck mode of operation is described below in conjunction with FIG. 3.

Figure 2:
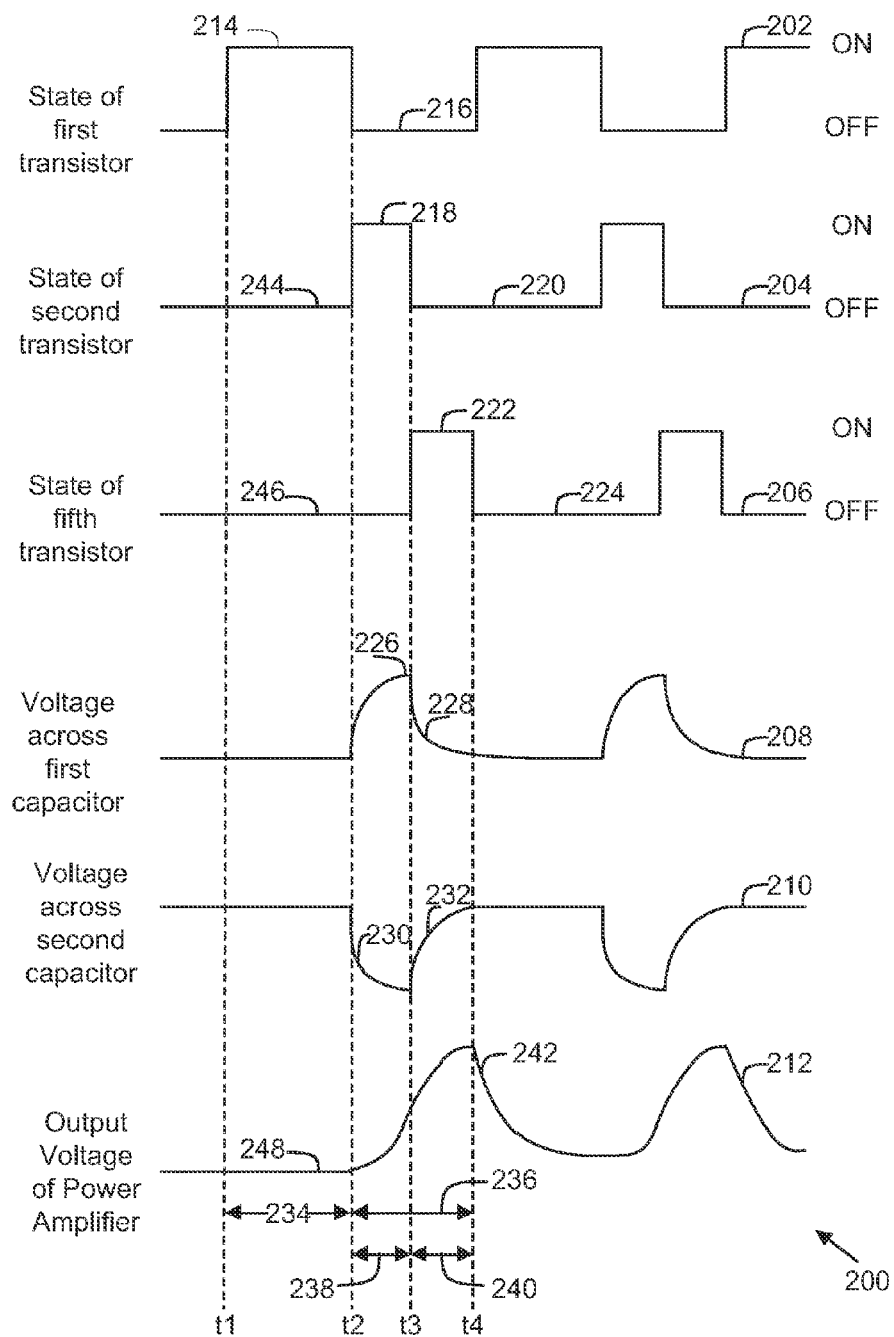
FIG. 2 is a graphical representation depicting states of the various transistors in the DC-DC converter during a boost mode of operation in accordance with an embodiment of the invention.

FIG. 2 is a graphical representation 200 depicting states of the various transistors in the DC-DC converter 100 during a boost mode of operation in accordance with an embodiment of the invention. The graphical representation 200 is explained in conjunction with FIG. 1. The graphical representation 200 includes a state diagram of the first transistor 120 (depicted by 202), a state diagram of the second transistor 122 (depicted by 204), a state diagram of the fifth transistor 128 (depicted by 206), a state diagram of the voltage across first capacitor 106 (depicted by 208), a state diagram of the voltage across second capacitor 108 (depicted by 210), and the output voltage 212.

During the boost mode of operation, the fourth transistor 126 and the seventh transistor 132 operate in the OFF state i.e. does not conduct current. In an embodiment, in a steady state (e.g., circuit functioning state), the first capacitor 106 and the second capacitor 108 are pre-charged.

During the time interval between the time instants $t_1$ and $t_2$ (depicted by 234), the first transistor 120 operates in the ON state (depicted by 214). The first transistor 120 offers a low impedance path to the current flowing through the first inductive element 118. Thus, the current flows from the voltage source 116, through the first inductive element 118 and the first transistor 120 forming a closed loop. Therefore, during the time interval 234, the voltage source 116 stores energy in the first inductive element 118 through the first transistor 120. In the switching network 104, during the time interval 234, the second transistor 122 and the fifth transistor 128 operate in the OFF state (depicted by 246 and 248 respectively). As the gate terminals of the third transistor 124 and the sixth transistor 130 receive the inverted second clock signal and the inverted third clock signal respectively, the third transistor 124 and the sixth transistor 130 operate in the ON state. As the third transistor 124 and the sixth transistor 130 are in the ON state, the potential across the first capacitor 106 is same as the potential across the second capacitor 108. The output voltage across the filter 110 settles to the potential across the second capacitor 108 and the first capacitor 106 (depicted by 250).

During the time interval between the time instants $t_2$ and $t_4$ (depicted by 236), the first transistor 120 operates in the OFF state (depicted by 216). In the time interval between $t_2$ and $t_3$ (depicted by 238), the second transistor 122 operates in the ON state (depicted by 218). Further, in the interval 238, the third transistor 124 operates in the OFF state (because the third transistor 124 receives inverted second clock signal). Thus, the first capacitor 106 charges to a potential equal to the sum of the potential across the first inductive element 118 and the voltage source 116 (depicted by 226).

Further, during the time interval 238, the fifth transistor 128 operates in the OFF state and the sixth transistor 130 operates in the ON state (because the sixth transistor 130 receives inverted third clock signal). As the sixth transistor 130 operates in the ON state, the second capacitor 108 discharges through the sixth transistor 130 and the filter 110 (depicted by 230).

In the time interval between $t_3$ and $t_4$ (depicted by 240), the fifth transistor 128 operates in the ON state (depicted by 222). Further, in the interval 240, the sixth transistor 130 operates in the OFF state (because the sixth transistor 130 receives inverted third clock signal). Thus, the second capacitor 108 charges to a potential equal to the sum of the potential across the first inductive element 118 at time instant $t_3$ and the voltage source 116 (depicted by 232).

Further, during the time interval 240, the second transistor 122 operates in the OFF state (depicted by 220) and the third transistor 124 operates in the ON state (because the third transistor 124 receives inverted second clock signal). As the third transistor 124 operates in the ON state, the first capacitor 106 discharges through the third transistor 124 and the filter 110 (depicted by 228).

In an embodiment, the alternate charging and discharging of the first capacitor 106 and the second capacitor 108 is continued in the subsequent operation of the DC-DC converter 100 in the boost mode. Voltage spikes in the DC-DC converter 100 generated due to switching of the first transistor 120 from the ON state to the OFF state and vice versa are suppressed due to alternate charging and discharging of the first capacitor 106 and second capacitor 108. Further, the filter 110 removes glitches in the output voltage 212.

Figure 3:
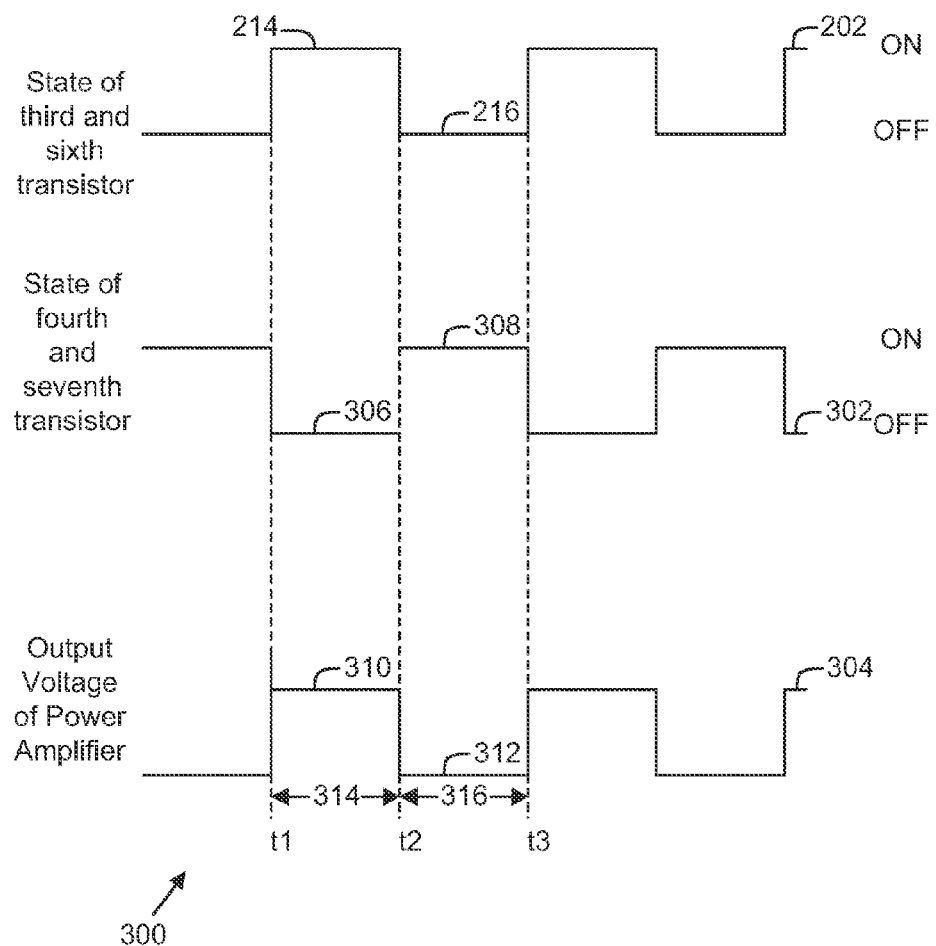
FIG. 3 is a graphical representation depicting states of the various transistors in the DC-DC converter during a buck mode of operation in accordance with an embodiment of the invention.

FIG. 3 is a graphical representation 300 depicting the states of the various transistors in the DC-DC converter 100 during a buck mode of operation in accordance with an embodiment of the invention. The graphical representation 300 is described in conjunction with FIG. 1. The graphical representation 300 includes state diagrams for the third transistor 124 and the sixth transistor 130 (depicted by 202). Further, the graphical representation 300 includes state diagrams for the fourth transistor 126 and the seventh transistor 132 (depicted by 302). Further, the graphical representation 300 includes a state diagram of an output voltage 304.

During the buck mode of operation, the first transistor 120 is in the OFF state, and the second transistor 122 and the fifth transistor 128 are in the ON state.

During the time interval between time instants $t_1$ and $t_2$ (depicted by 314), the third transistor 124 and the sixth transistor 130 operate in the ON state. Further, in the time interval 314, the fourth transistor 126 and the seventh transistor 132 operate in the OFF state (depicted by 306). Since, the third transistor 124 and the sixth transistor 130 operate in the ON state; the third transistor 124 and the sixth transistor 130 provide a low impedance path for the current flowing from the voltage source 116 to the filter 110 via the sixth transistor 130 and the third transistor 124. Thus, magnitude of the output voltage 304 (across the filter 110) is same as the magnitude of the voltage source 116 (depicted by 310). In an embodiment, the second inductive element 134 charges to the magnitude of the voltage source 116.

Similarly, in time interval between time instants $t_2$ and $t_3$ (depicted by 316), the fourth transistor 126 and the seventh transistor 132 operate in the ON state (depicted by 308). Since, the fourth transistor 126 and the seventh transistor 132 operate in the ON state; the fourth transistor 126 and the seventh transistor 132 provide a low impedance path for the current flowing from the filter 110 to ground. In an embodiment, the second inductive element 134 discharges to the ground through the fourth transistor 126 and the seventh transistor 132. Thus, the magnitude of the output voltage 304 is less than the magnitude of the voltage source 116 (depicted by 312).

Further, in buck mode, the first capacitor 106 and the second capacitor 108 does not discharge through the filter 110. Thus, the magnitude of the voltage across first capacitor 106 and the second capacitor 108 does not contribute to the magnitude of the output voltage.

The above described operation is repeated for the subsequent time period the buck mode. Since, the output voltage varies in accordance with the waveform depicted by 304; the magnitude of the average output voltage is less in comparison with the magnitude of the input voltage source 116.

In an embodiment, the DC-DC converter 100 resides in an electronic system. Examples of the electronic system include, but are not limited to, a personal digital assistant (PDA), a smart-phone, a mobile device, a tablet computer and the like.

The embodiments of the present invention provide several advantages. The electronic circuit according to the embodiments filters the current spikes towards the battery in the boost mode and filters the output voltage in the buck mode. Since, the clock signals of the transistors in the boost mode and the buck mode operate independently, envelope tracking may be realized. Additionally, low voltage ripple can be achieved by clocking the transistors in the buck and the boost mode in such a way that the ripple generated in the boost mode is cancelled by the ripple generated in the buck mode. Henceforth, stringent spurious specifications can be achieved.

While various embodiments of the present invention have been illustrated and described, it will be clear that the electronic components (e.g., transistors, inductors, capacitors, etc.) of the boost buck DC-DC converter can be fabricated as a single integrated circuit, or as discrete circuit components connected together (as shown in FIG. 1). Further, various other possible combinations of the electronic components may also be used without departing from the scope of the invention.

While various embodiments of the present invention have been illustrated and described, it will be clear that the invention is not limited to these embodiments only. Numerous modifications, changes, variations, substitutions and equivalents will be apparent to those skilled in the art, without departing from the basic scope and spirit of the invention, as described in the claims that follow.

What is claimed is:
1. A DC-DC converter comprising:
   a voltage source connected to an input switch, formed by a first transistor, through an inductive element such that a closed loop is formed;

a switching network receiving one or more clock signals from an external clock source, the switching network having a first terminal connected to the inductive element, a second terminal connected to a first capacitor, and a third terminal connected to a second capacitor, wherein the switching network enables charging of the first capacitor and the second capacitor based on the one or more clock signals such that the first capacitor and the second capacitor are charged alternately; and a filter connected to a fourth terminal of the switching network, wherein the first capacitor and the second capacitor discharge alternately based on the one or more clock signals through the filter.

2. The DC-DC converter of claim 1 further comprising a power amplifier connected to the filter.

3. The DC-DC converter of claim 1 operates in at least one of a first mode and a second mode.

4. The DC-DC converter of claim 3, wherein the first mode corresponds to a boost mode and the second mode corresponds to a buck mode.

5. The DC-DC converter of claim 3, wherein the input switch formed by a first transistor having a source terminal connected to a ground terminal, a drain terminal connected to the inductive element and the first terminal of the switching network, and a gate terminal receiving a first clock signal from the one or more clock signals when the DC-DC converter operates in the first mode.

6. The DC-DC converter of claim 5, wherein the first transistor operates in OFF state in the second mode.

7. The DC-DC converter of claim 3, wherein the switching network comprises:

a second transistor having a source terminal connected to the first terminal, a drain terminal connected to the second terminal, and a gate terminal receiving a second clock signal from the external clock source when the DC-DC converter operates in the first mode;

a third transistor having a source terminal connected to the second terminal, a drain terminal connected to the fourth terminal, and a gate terminal receiving an inverted second clock signal from the external clock source when the DC-DC converter operates in the first mode;

a fourth transistor having a drain terminal connected to the fourth terminal, and a source terminal connected to a ground terminal;

a fifth transistor having a source terminal connected to the first terminal, a drain terminal connected to the third terminal, and a gate terminal receiving a third clock signal from the external clock source when the DC-DC converter operates in the first mode;

a sixth transistor having a source terminal connected to the third terminal, a drain terminal connected to the fourth terminal and the drain terminal of the third transistor, and a gate terminal receiving an inverted third clock signal from the external clock source when the DC-DC converter operates in the first mode; and a seventh transistor having a drain terminal connected to the fourth terminal, and a source terminal connected to the ground terminal.

8. The DC-DC converter of claim 7, wherein the fourth transistor and the seventh transistor operates in OFF state in the first mode.

9. The DC-DC converter of claim 7, wherein the second transistor and the fifth transistor operates in ON state in the second state.

10. The DC-DC converter of claim 7, wherein the gate terminals of the third transistor, fourth transistor, sixth transistor, and the seventh transistor receive a first clock signal while the DC-DC converter operates in the second mode.

11. The DC-DC converter of claim 1, wherein the first capacitor and the second capacitor are connected to a ground terminal.

12. The DC-DC converter of claim 1, wherein the filter is a LC filter.

13. A DC-DC converter operating in at least one of a first mode and a second mode, the DC-DC converter comprising:

a voltage source connected to an input switch formed by a first transistor, through an inductive element such that a closed loop is formed;

a switching network comprising:

a second transistor having a source terminal connected to the inductive element and the input switch, a drain terminal connected to a first capacitor, and a gate terminal receiving a second clock signal when the DC-DC converter operates in the first mode, wherein the second transistor operates in ON state when the DC-DC converter operates in the second mode;

a third transistor having a source terminal connected to the drain terminal of the second transistor, a gate terminal receiving an inverted second clock signal when the DC-DC converter operates in the first mode, the gate terminal receiving a first clock signal when the DC-DC converter operates in the second mode;

a fourth transistor having a source terminal connected to a ground terminal, and a drain terminal connected to a drain terminal of the third transistor, a gate terminal receiving a first clock signal when the DC-DC converter operates in the second mode, wherein the fourth transistor operates in OFF state when the DC-DC converter operates in the first mode;

a fifth transistor having a source terminal connected to the source terminal of the second transistor, a drain terminal connected to a second capacitor, a gate terminal receiving a third clock signal when the DC-DC converter operates in the first mode, wherein the fifth transistor operates in ON state when the DC-DC converter operates in the second mode;

a sixth transistor having a source terminal connected to the drain terminal of the fifth transistor, a drain terminal connected to the drain terminal of the fourth transistor, and a gate terminal receiving an inverted third clock signal when the DC-DC converter operates in the first mode, wherein the gate terminal receives the first clock signal when the DC-DC converter operates in the second mode; and a seventh transistor having a drain terminal connected to the drain terminal of the sixth transistor, a source terminal connected to the ground terminal, and a gate terminal receiving the first clock signal when the DC-DC converter operates in the second mode, wherein the seventh transistor operates in OFF state when the DC-DC converter operates in the first mode;

wherein the first capacitor and the second capacitor are charged alternately based on the second clock signal and the third clock signal when the DC-DC converter operates in the first mode; and a filter connected to the drain terminal of the sixth transistor, wherein the first capacitor and the second capacitor discharge through the filter alternately based on the inverted second clock signal and the inverted third clock signal.

14. The DC-DC converter of claim 13, wherein the first mode corresponds to a boost mode and the second mode corresponds to a buck mode.

15. The DC-DC converter of claim 13, the first transistor having a source terminal connected to the ground terminal, a drain terminal connected to the inductive element, and a gate terminal receiving a first clock signal when the DC-DC converter operates in the first mode, wherein the first transistor operates in OFF state when DC-DC converter operates in the second mode.

16. The DC-DC converter of claim 13, wherein the voltage source is a battery.

17. The DC-DC converter of claim 13 resides in a mobile device.

18. An electronic circuit comprising:
a DC-DC converter comprising:
   a battery connected to an input switch through an inductive element such that a closed loop is formed;
   a switching network receiving one or more clock signals from an external clock source, the switching network having a first terminal connected to the inductive element and a second terminal connected to a first capacitor, wherein the switching network enables charging of the first capacitor based on the one or more clock signals; and
   a filter connected to a fourth terminal of the switching network, wherein the first capacitor discharges based on the one or more clock signals through the filter, and
a power amplifier connected at the output of the filter.

19. The electronic circuit of claim 18, wherein the switching network further comprises a third terminal connected to a second capacitor, and wherein the second capacitor charges and discharges based on the one or more clock signals.

* * * * *